United States Patent [19]

Loiselle et al.

[11] Patent Number: 5,670,556
[45] Date of Patent: Sep. 23, 1997

[54] FOAMABLE SILOXANE COMPOSITIONS AND SILICONE FOAMS PREPARED THEREFROM

[75] Inventors: Brian Paul Loiselle, Midland; Lawrence Joseph Rapson, Bay City, both of Mich.

[73] Assignee: Dow Corning Corporation, Midland, Mich.

[21] Appl. No.: 767,484

[22] Filed: Dec. 16, 1996

[51] Int. Cl.$^6$ .................................................... C08J 9/00
[52] U.S. Cl. ................................... 521/154; 521/134
[58] Field of Search ................................ 521/154, 134

[56] References Cited

U.S. PATENT DOCUMENTS

| | | | |
|---|---|---|---|
| 4,026,835 | 5/1977 | Lee et al. | 260/2.5 S |
| 4,461,851 | 7/1984 | Hashimoto | 521/110 |
| 4,495,227 | 1/1985 | Tanaka | 427/373 |
| 4,555,529 | 11/1985 | Lee et al. | 521/124 |
| 4,593,049 | 6/1986 | Bauman et al. | 521/99 |
| 4,599,367 | 7/1986 | Bauman et al. | 521/71 |
| 4,631,299 | 12/1986 | Laisney et al. | 521/77 |
| 4,728,567 | 3/1988 | Razzano et al. | 428/317.1 |
| 4,888,217 | 12/1989 | Jones | 427/236 |

*Primary Examiner*—Morton Foelak
*Attorney, Agent, or Firm*—Robert L. McKellar

[57] ABSTRACT

Foamable organosiloxane compositions which yield, upon cure, silicone foams having low density and decrease friability, comprising (A) a siloxane base polymer system which is a combination of a high molecular weight hydroxyl-group containing siloxane polymer and a low molecular weight hydroxyl-group containing siloxane polymer; (B) a silicon-containing crosslinker for the siloxane base polymer system, wherein the crosslinker contains at least two —SiH groups per molecule; (C) a platinum group catalyst; and optionally (E) a blowing agent; and silicone foams prepared therefrom. A method of weather-stripping a door or window using the silicone foam so prepared.

20 Claims, No Drawings

FOAMABLE SILOXANE COMPOSITIONS AND SILICONE FOAMS PREPARED THEREFROM

BACKGROUND OF THE INVENTION

1. Field of the Invention

This invention relates to foamable siloxane compositions which yield, upon cure, silicone foams having decreased friability. The decreased friability of these foams is provided by a combination of hydroxy-containing organosiloxanes as the base polymer. The friability of the foam that results when a composition of the present invention is cured is comparable to or less than the friability of silicone foams found in the art, but have the benefit of being of lower density and of being less expensive to prepare. This invention also relates to silicone foams prepared from such foamable siloxane compositions. This invention also relates to a method of using the siloxane foams of the present invention to weather-strip windows and doors.

2. Description of the Related Art

In U.S. Pat. No. 4,026,835, Lee et al. teach a method of preparing a heat curable organosiloxane foam comprising an organohydrogensiloxane, a hydroxylated organosiloxane and a rhodium catalyst. In column 5, lines 51–56, Lee et al. teach that molecular weight of any particular ingredient is not significant.

In U.S. Pat. No. 4,461,851, Hashimoto teaches a foam-forming organopolysiloxane composition comprising 100 parts of a diorganopolysiloxane diol having a dp of 200 to 3000, 0.5 to 50 parts by weight of a diorganopolysiloxane diol having a dp of 2 to 46, an organosiloxane having silicon-bonded hydrogen atoms, and a platinum-containing compound.

In U.S. Pat. No. 4,495,227, Tanaka teaches a foamable silicone-containing composition comprising a liquid diorganopolysiloxane with at least two functional groups which may be hydroxyl groups, a liquid organosilicon compound with at least three-functional groups which may be hydrogen atoms, a condensation catalyst and a blowing agent which is an encapsulated low-boiling organic liquid.

In U.S. Pat. No. 4,555,529, Lee et al. teach a foamable polyorganosiloxane composition consisting essentially of a vinyl-containing polydimethylsiloxane, an organohydrogensiloxane, a platinum catalyst, a foam stabilizer and a blowing agent that can be compressed or liquefied at moderate pressures In U.S. Pat. No. 4,593,049, Bauman et al. teach a method of producing an elastomeric silicone foam said method consisting of mixing a vinyl-containing polydiorganosiloxane, a hydroxylated polydiorganosiloxane, a platinum catalyst, an organohydrogensiloxane, a foam stabilizer and optionally an alcohol and allowing the mixture to form a froth and cure.

In U.S. Pat. No. 4,599,367, Bauman et al. teach an open-cell silicone foam composition comprising a hydroxyl-terminated polydiorganosiloxane, a silicon hydride, water, a platinum catalyst, and optionally a foam stabilizer and/or an alcohol.

In U.S. Pat. No. 4,631,299, Laisney et al. teach an organopolysiloxane composition comprising a vinyl-containing diorganopolysiloxane having a viscosity of 100 to 250,000 mPa.s, a dimethylpolyorganosiloxane having a viscosity of 10 to 5000 mPa.s., a hydroxyl-containing diorganopolysiloxane having a viscosity of 5 to 10,000 mPa.s, a liquid resin, a liquid organohydrogensiloxane, a filler and a platinum catalyst.

In U.S. Pat. No. 4,728,567, Razzano et al. teach a silicone foam composition comprising an organohydrogensiloxane, a hydroxylated organosiloxane and a platinum catalyst.

In U.S. Pat. No. 4,888,217, Jones teaches a foamable silicone composition comprising as its sole components an alkyl-hydrogen-siloxane unit-containing polysiloxane, a hydroxyl-containing polysiloxane, a compound containing a carbon bonded hydroxyl group, a polyorganosiloxane and a platinum catalyst.

The compositions of the present invention, unlike the compositions described above, contain a combination of high and low molecular weight hydroxyl-containing siloxane polymers and yield, upon cure, silicone foams having reduced friability.

SUMMARY OF THE INVENTION

This invention relates to foamable siloxane compositions which yield, upon cure, silicone foams having low density and decreased friability. Such properties are provided by the combination of hydroxyl-containing siloxane polymers having high and low molecular weights. This invention also relates to silicone foams prepared from such foamable siloxane compositions and a method of weather-stripping doors and windows using such silicone foam.

DETAILED DESCRIPTION OF THE INVENTION

This invention relates to foamable organosiloxane compositions which yield, upon cure, silicone foams having low density and decreased friability. The compositions of the present invention are comprised of:

(A) a siloxane base polymer system comprising:
  (i) a high molecular weight polyorganosiloxane containing an average of at least two hydroxyl groups per molecule and having a viscosity at 25° C. ($V_i$); and
  (ii) a low molecular weight polyorganosiloxane containing an average of at least two hydroxyl groups per molecule and having a viscosity at 25° C. ($V_{ii}$); wherein $V_{ii} \leq V_i - 25{,}000$ mPa.s.;

(B) a silicon-containing crosslinker for the siloxane base polymer system, wherein the crosslinker contains at least two —SiH groups per molecule; and (C) a platinum group catalyst sufficient for curing the foamable organosiloxane composition The essence of this invention is the combination of a high molecular weight hydroxyl-containing polymer and a low molecular weight hydroxyl-containing polymer. Foam-forming compositions containing this combination yield, upon cure, silicone foams which have low density, decreased friability and increased elongation. Also, the resistance to tearing under flex of these compositions is unexpectedly decreased. For purposes of this invention, any reference to viscosity is based on a temperature of 25° C.

Component A

Component (A) of the present invention is a siloxane base polymer system. Component (A) is the major ingredient of the present invention. It is comprised of (i) a high molecular weight polyorganosiloxane and (ii) a low molecular weight polyorganosiloxane. The viscosity of the high molecular weight polyorganosiloxane is $V_i$. The viscosity of the low molecular weight polyorganosiloxane is $V_{ii}$. By the term "high molecular weight organopolysiloxane" we mean a polyorganosiloxane having an average viscosity, $V_{ii}$, wherein $V_i \geq V_{ii} + 25,000$ mPa.s. By the term "low molecular weight polyorganosiloxane" we mean a polyorganosiloxane having an average viscosity, $V_{ii}$, where $V_{ii} \leq V_i - 25,000$ mPa.s.

Component (i)

Component (i) is a high molecular weight polyorganosiloxane having an average of at least two hydroxyl groups per molecule and having a viscosity, $V_i$, wherein $V_i \geq V_{ii} + 25,000$ mPa.s. The hydroxyl radicals of component (i) are preferably located at the terminals of the molecule, however, one or more can be bonded to non-terminal siloxane units. In preferred embodiments, component (i) has the following general formula:

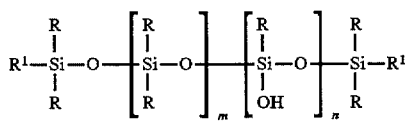

where R is a substituted or unsubstituted monovalent hydrocarbon radical. $R^1$ is R or a hydroxyl radical and the values of m and n are selected such that the resulting polyorganosiloxane has an average of at least two hydroxyl groups and a viscosity, $V_i$, wherein $V_i \geq V_{ii} + 25,000$ mPa.s., wherein $V_{ii}$ is the viscosity of component (ii).

In preferred embodiments, the viscosity of components (i) and (ii) are selected such that $V_i \geq V_{ii} + 30,000$ mPa.s In preferred embodiments, $V_i \geq 30,000$ mPa.s. In more preferred embodiments, $V_i \geq 45,000$ mPa.s.

R is preferably selected from the group consisting of alkyl groups having 1 to 6 carbon atoms, halogenated alkyl groups and phenyl-containing groups. More preferably R is a methyl group, a 3,3,3-trifluoropropyl or a phenyl group. Most preferably R is a methyl group.

Component (i) may be a single polyorganosiloxane or a mixture of two or more polyorganosiloxanes as long as the mixture has an average viscosity that is at least 25,000 mPa.s. greater than the average viscosity of component (ii). In preferred embodiments, the viscosity of component (i) is 45,000 to 300,000 mPa.s and component (i) is substantially free of polyorganosiloxanes that have viscosities that are $\leq V_{ii} + 25,000$ mPa.s.

In compositions of the present invention component (i) constitutes 5 to 75 parts by weight per 100 parts by weight of component (A). When component (i) constitutes more than 75 parts, the resulting composition yields, upon cure, a tacky foam. When component (i) constitutes less than 5 parts, the resulting composition yields, upon cure, a foam having increased friability and decreased elongation. In preferred embodiments, component (i) constitutes 25 to 60 parts by weight per 100 parts by weight of component (A). In more preferred embodiments, component (i) constitutes 40 to 55 parts of component (A).

Component (ii)

Component (ii) is a low molecular weight polyorganosiloxane having an average of at least two hydroxyl groups per molecule and a viscosity, $V_{ii}$, wherein $V_{ii} \leq V_i - 25,000$ mPa.s. The hydroxyl radicals of component (ii) are preferably located at the terminals of the molecule, however, one or more can be bonded to non-terminal siloxane units. In preferred embodiments, component (ii) has the following general formula:

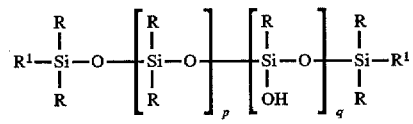

where R and $R^1$ are as described above and the values of p and q are selected such that the resulting polyorganosiloxane has an average of at least two hydroxyl groups and a viscosity, $V_{ii}$, wherein $V_{ii} \leq V_i - 25,000$ mPa.s., wherein $V_i$ is the viscosity of component (i).

In preferred embodiments of component (ii), $V_{ii} \leq 9,500$ mPa.s. In more preferred embodiments, $V_{ii} \leq 5,000$ mPa.s., and in most preferred embodiments, $V_{ii} \leq 2,000$ mPa.s.

R is preferably selected from the group consisting of alkyl groups having 1 to 6 carbon atoms, halogenated alkyl groups and phenyl-containing groups. More preferably R is a methyl group, a 3,3,3-trifluoropropyl or a phenyl group. Most preferably R is a methyl group.

Component (ii) may be a single polyorganosiloxane or a mixture of two or more polyorganosiloxanes as long as the mixture has an average viscosity that is at least 25,000 mPa.s. less than the average viscosity of component (i). In preferred embodiments, component (ii) is substantially free of polyorganosiloxanes having viscosities that are $\geq V_i - 25,000$ mPa.s..

In compositions of the present invention component (ii) constitutes 25 to 95 parts by weight per 100 parts by weight of component (A). In preferred embodiments, component (ii) constitutes 40 to 75 parts per 100 parts of component (A). In more preferred embodiments, component (ii) constitutes 45 to 60 parts per 100 parts of component (A).

In preferred embodiments of component (A), $V_i \geq 30,000$ mPa.s and $V_{ii} \leq 2000$ mPa.s. In another preferred embodiment of component (A), $V_i \geq 45,000$ mPa.s and $V_{ii} \leq 9500$ mPa.s. In a more preferred embodiment of component (A), $V_i \geq 45,000$ m.Pa.s and $V_{ii} \geq 5000$ mPa.s., and in a most preferred embodiment, $V_i \geq 45,000$ mPa.s and $V_{ii} \leq 2000$ mPa.s.

Component B

Component (B) is a silicon-containing crosslinker for the siloxane base polymer system of the present invention. It is an organohydrogensiloxane having an average of at least two silicon-bonded hydrogen atoms per molecule. In order for the composition of the present invention to cure, the sum of the average number of silicon-bonded hydroxyl groups per molecule of component (A) plus the average number of silicon-bonded hydrogen atoms per molecule of component (B) must be greater than four. The silicon-bonded hydrogen atoms in the organohydrogensiloxane react with the hydroxy radicals of the polyorganosiloxanes of component (A) in order to cure the composition of the present invention. Depending upon the mount and hydrogen content of component (B) used, the silicon-bonded hydrogen atoms in the organohydrogensiloxane may also be used to generate hydrogen for foaming the composition of the present invention. Organohydrogensiloxanes that may be used as component (B) preferably contain an average of more than two silicon-boned hydrogen atoms per molecule, and more preferably contain an average of at least three silicon-bonded hydrogen atoms per molecule. The remaining valances on the silicon atoms are satisfied with organic groups selected from alkyl groups having 1 to 6 carbon atoms and phenyl groups. Preferred alkyl groups include methyl, ethyl and hexyl. Most preferred are methyl groups.

The organohydrogensiloxane of component (B) can have a linear or branched structure, and can be a homopolymer, a copolymer, or a mixtures of these types of polymers.

A preferred linear type of organohydrogensiloxane is a polymethylhydrogensiloxane. Another preferred linear type of organohydrogensiloxane has a viscosity of from 0.01 to 10 Pa.s at 25° C. and comprises dialkylsiloxane and alkylhydrogensiloxane units with trialkylsiloxy terminal units. The alkyl radicals contain from 1 to 4 carbon atoms, and are most preferably methyl.

In preferred embodiments of the present invention, component (B) comprises two types of organohydrogensiloxanes, one of which is a polymethylhydrogensiloxane and the other of which is a copolymer containing methylhydrogensiloxane and dimethylsiloxane units.

The relative amount of each of the components (A) and (B) in the present composition is a weight ratio of from 16:1 to 1:1. A preferred ratio is from 6:1 to 2:1.

Component C

Component (C) is a metal from the platinum group of the periodic table or a compound of such a metal. These metals include platinum, palladium and rhodium. Platinum and platinum compounds are preferred based on the high activity level of these catalysts in hydrosilylation reactions. Catalysts that may be used as component (C) in the foam-forming composition of the present invention are any of the known forms that are effective in promoting the reaction of —SiH groups with silicon-bonded hydroxyl groups. Such catalysts are also efficient in promoting the reaction between —SiH groups and ≡COH groups in organic alcohols to provide hydrogen for the foaming process. Suitable forms of platinum include but are not limited to chloroplatinic acid, platinum compounds and complexes of platinum compounds with unsaturated organic compounds or with siloxanes having silicon-bonded groups containing ethylencially unsaturated groups. Additional examples of suitable platinum catalysts include complexes of platinous halides or chloroplatinic acid with divinyldisiloxane and tetramethyldisiloxane. Suitable platinum catalysts are described in U.S. Pat. No. 3,419,593, which issued on Dec. 31, 1968, and which is incorporated herein by reference for what it teaches about the preparation of such catalysts.

The concentration of component (C) in the present composition is equivalent to a platinum concentration of from 0.1 to 500 parts by weight of platinum metal, preferably from 5 to 150 parts by weight of platinum metal, per million parts (ppm), based on the combined weights of components (A) and (B).

The compositions of the present invention yield, upon cure, silicone foams having low density, and decreased friability. The present inventors discovered that a silicone foam prepared using components (i), (ii), (B), (C) and (E) unexpectedly has a decreased resistance to tearing under flex. The present inventors also discovered that the resistance to tearing under flex of a foam prepared from such a composition can be restored by further including a silicone resin copolymer (component (D)). The present inventors also discovered that foamable organosiloxane compositions containing both a combination of high and low molecular weight hydroxyl-containing polyorganosiloxanes and a silicone resin copolymer have a significantly and unexpectedly decreased friability as compared to foamable organosiloxane compositions containing just the high and low molecular weight hydroxyl-containing polyorganosiloxanes or just the silicone resin copolymer. The present inventors also discovered that foamable organosiloxane compositions containing both a combination of high and low molecular weight hydroxyl-containing polyorganosiloxanes and a silicone resin copolymer have a significantly and unexpectedly decreased friability, increased tear strength, increased tensile strength and increased elongation as compared to foamable organosiloxane compositions which do not contain either the combination of high and low molecular weight hydroxyl-containing polyorganosiloxanes nor a silicone resin copolymer.

Optional Ingredients

Component D

Component (D) is a silicone resin copolymer. It is an optional ingredient in the composition of the present invention. Preferred siloxane resin copolymers include copolymers consisting essentially of $(R^3)_3SiO_{1/2}$ units and $SiO_2$ units. $R^3$ is an alkyl group. Preferred $R^3$ groups have 1 to 4 carbon atoms. More preferably $R^3$ is a methyl group. The molar ratio of $(R^3)_3SiO_{1/2}$ units to $SiO_2$ units is 0.6:1 to 0.9:1. The siloxane resin copolymer contains 0.1 to 5 weight percent hydroxyl based on solids as determined by FTIR (ASTM E -168). In preferred embodiments, the siloxane resin copolymer contains from 1 to 5 weight percent hydroxyl group. In more preferred embodiments, the siloxane resin copolymer contains from 2.4 to 2.9 weight percent hydroxyl group. Compositions of the present invention preferably contain 7.5 to 35 parts by weight of component (D) per 100 parts by weight of component (A).

Siloxane resin copolymer may be prepared as described in U.S. Pat. No. 4,310,678, which is incorporated herein for what it teaches regarding the preparation of siloxane resin copolymers. Siloxane resin copolymers are typically prepared in an organic solvent. In preferred embodiments, the solvent solution containing the siloxane resin copolymer is mixed with the organohydrogensiloxane described as component (B) above. The mixture is then heated to remove the organic solvent. The resulting mixture can then be admixed with the other components of the present invention.

Component E

Component (E) is a blowing agent. Component (E) is an optional ingredient that reduces the density of foams prepared from foam-forming compositions containing components (A), (B), (C) and (D). The amount of component (E) that is needed to reduce the density of the foam of the present invention varies depending upon the composition of the foam-forming composition and the blowing agent used. In preferred embodiments of the present invention, the composition contains 0.1 to 10 parts by weight of component (E) per 100 parts of the combined weights of components (A), (B) and (C) and yields, upon cure, a silicone foam having a density that is less than or equal to 8 pounds per cubic foot (pcf), more preferably less than or equal to 6.5 pcf and most preferably less than or equal to 5.5 pcf.

Compositions of the present invention may contain one or more blowing agents. Compounds which are usable as blowing agents for the present compositions are compounds which generate a gas when used in the composition of the present invention or compounds which volatilize to a gaseous state when used in the composition of the present invention. Such compounds include, but are not limited to water, alcohols, silanols and other —OH containing compounds. The alcohols which may be used as the blowing agent for the present invention include organic alcohols and the organic alcohols which may be used in the present invention include monofunctional alcohols and polyols. The preferred monofunctional alcohol is an organic alcohol having 1 to 12 carbon atoms and at least one hydroxyl group per molecule. The carbon chain which makes up the backbone of the organic alcohol may be straight chained or branched or may have an aromatic ring to which a hydroxyl group is not directly bonded. Examples of monofunctional alcohols which are usable as blowing agents for the present invention include methanol, ethanol, n-propanol, isopropanol, n-butanol, 2-butanol, ten-butanol, n-octanol, and benzyl alcohol. The preferred monofunctional alcohol is n-propanol. The preferred polyol is an organic alcohol having 3 to 12 carbon atoms and containing an average of at least two hydroxyl groups per molecule. The carbon chain which makes up the backbone of the polyol may be straight chained or branched or may have an aromatic ring to which a hydroxyl group is not directly bonded. The preferred polyol is a diol. Preferred diols are 1,4 butanediol, 1,5 pentanediol, and 1,7-heptanediol. Preferred blowing agents for the composition of the present invention are organic alcohols.

Other Optional Ingredients

In additions to the ingredients identified as components (A), (B), (C), (D), and (E), the foamable organosiloxane composition of the present invention can contain various other ingredients to modify the properties of the curable composition and/or the cured foam.

These optional ingredients include but are not limited to finely divided reinforcing and non-reinforcing mineral fillers such as fumed silica, precipitated silica, quartz and calcium carbonate; metal oxides such as alumina, hydrated alumina, ferric oxide and titanium dioxide, pigments such as carbon black and zinc oxide, organic pigments and dyes; antioxidants, heat stabilizers, thixotropic agents, foam stabilizers, ultraviolet light stabilizers, flame retarding agents and catalyst inhibitors such as cyclic methylvinylsiloxanes to increase the working time of the foamable organosiloxane compositions of the present inventions.

The composition of the present invention is prepared by mixing together components (A) through (C) and any optional ingredients. As long as the components and any optional ingredients are mixed to homogeneity, the method of mixing is not critical. Mixing can be done, for example, by manually stirring, using static mixing equipment, dynamic mixing equipment, or impingement-type mixing equipment.

The foamable organosiloxane composition of the present invention, will begin to foam, at normal ambient temperatures, shortly after mixing has commenced. If desired, the onset of foaming and curing can be delayed by including an inhibitor in the foamable organosiloxane composition. While the composition of the present invention will foam and cure at normal ambient temperatures, faster foaming and curing can be achieved by exposing the foamable organosiloxane composition to elevated temperatures. The silicone foams that are prepared by curing the compositions of the present invention may be post-cured to reduced their compression set, by exposing the cured silicone foam to elevated temperatures. Compression set is a measure of the ability of a foam to retain its elastic properties after prolonged exposure to a compressive force. Foams with lower compression sets are better at retaining their elastic properties.

The present invention also relates to a method of weather stripping a window or a door. The method comprises the steps of preparing a foamable organosiloxane composition, applying the composition to a fenestration product, allowing the composition to foam and allowing the composition to cure. A fenestration is an opening in a wall. Fenestration products are used to enclose such openings and include windows and doors.

The present invention also relates to a method of weather-stripping a window or a door, the method comprising the steps of preparing a foamable organosiloxane composition, allowing the composition to foam to produce a pre-formed weather-strip, allowing the composition to cure and applying the pre-formed weather-strip to a fenestration product. In preferred embodiments, the pre-formed weather-strip is wrapped with a protective sheathing, such as polyethylene, prior to application to the fenestration product. The foamable organosiloxane compositions of the above methods are as described above The foamable organosiloxane compositions of the present invention may be prepared as a two part composition, with the two parts mixed immediately before application. The foamable organosiloxane composition may be applied manually, with the use of manually operated dispensing equipment or with the use of automatic dispensing equipment. The use of dispensing equipment is preferred.

The foamable organosiloxane compositions of the present invention yield, upon cure, silicone foams. Both the curing and foaming reactions will occur at ambient temperature and are accelerated by heating the foamable organosiloxane composition. Reaction temperatures from about 55° F. to about 200° F. are preferred. Most preferred is a temperature of about 65° F. to about 90° F. The time required for curing and foaming of the present compositions is typically from about 0.1 to 60 minutes, based on the reactivity of the components and the temperatures used.

EXAMPLES

The following examples describe preferred embodiments of the foamable organosiloxane composition of the present invention and should not be interpreted as limiting the scope of the invention defined in the accompanying claims. All parts and percentages in the examples are by weight and viscosities were measured at 25° C.

The silicone foams of the Examples and the Comparative Examples were prepared according to the following method. In order to measure the density, friability and resistance to tearing under flex for each of the silicone foams prepared from the compositions of the Examples and the Comparative Examples, Part A of each of the compositions was prepared by mixing the ingredients of Part A to homogeneity. Part B of each of the compositions was prepared by mixing the ingredients of Part B to homogeneity. Before each silicone foam was prepared, a paper cup, capable of containing a volume of precisely 300 cubic centimeters was obtained and weighed. Thirty (30) grams of Part A and 30 grams of Part B were poured into the cup and vigorously mixed in the cup by hand for 6 seconds. The resulting composition was exposed to ambient conditions and allowed to foam and cure in the cup for 5 minutes. The foam was then cut smoothly across the top of the cup, leaving a foam-filled cup and a foam cap. The density of each of the cured foams was calculated by measuring the weight of the foam in the foam-filled cup and dividing the weight by the 300 cubic centimeters. The resistance to tearing under flex and the friability of each cured silicone foam was then tested according to the following methods. The resistance to tearing under flex of each sample was determined by using a fold test. The fold test was run using the foam cap from the foam that had been cured in the cup. The foam cap was folded over. The folding over was accomplished by positioning the cut surface of the foam cap upward and the opposite surface facing the ground. The thumbs were place on opposite ends of the cut surface and the foam was bent over the finger tips. Elongation occurred on the cut surface of the foam while compression occurred on the opposite surface of the foam. Foams which did not tear during this fold testing were given a "Pass" rating. Foams given a "Pass" rating were resistant to tearing under flex. Foams that tore during the fold test were given a "Fail" rating. Foams given a "Fail" rating did not resist tearing under flex.

The friability of the each of the foams was determined by rubbing a finger back and forth, for 5 cycles, along the cut surface of the foam in the cup. Sufficient finger pressure was exerted to form a slight indentation in the foam. If the effect of this treatment was excessive surface crumbling, then the friability of the foam was described as "high". If there was no effect or only a slight crumbling, the foam was given a "low" friability rating. A "moderate" rating was given to foams which exhibited markedly reduced, but still considerable crumbling as compared to foams with "high" friability. The results of these tests are recorded in Table 1.

In order to measure the elongation, tensile strength and tear strength of each of the foams, 25 grams of Part A was prepared as described above and placed into one barrel of a Techcon disposable double barrel syringe equipped with a 13 element static mixer. Twenty-five grams of Part B was prepared as described above and placed into the other barrel of the Techcon disposable double barrel syringe.

Parts A and B were used to prepare a sheet of cured foam. In order to prepare the sheet of cured foam, a sheet of matte polyester film was creased and doubled over. The creased end of the polyester film was feed between the rollers of a laboratory drawn down coater having a gap of 0.040 inches. Using a Techcon dispensing gun, Parts A and B were mixed to prepare a foamable organosiloxane composition and dispensed between the top and bottom ends of the polyester film. The film was pulled briskly through the laboratory drawndown coater to spread the foamable composition between the ends of the polyester film, resulting in a smooth, flat sheet of foam. The foamable composition was exposed to ambient conditions for 15 minutes The elongation, tensile and tear properties of the foam were then tested. Tensile strength and elongation were tested according to ASTM D 412, using die A. Tear strength was tested according to ASTM D 624, using die C. The results of these tests are recorded in Table 1.

COMPARATIVE EXAMPLE 1

Part A 60.4 parts by weight of hydroxy-terminated polydimethylsiloxane having a viscosity of approximately 2,000 mPa.s.

31.3 parts by weight of hydroxy-terminated polydimethylsiloxane having a viscosity of approximately 75 mm$^2$/s and having a hydroxyl content of about 1.75 weight percent.

5 parts by weight of a mixture containing equal parts by weight of (1) a trimethylsiloxy-terminated polydimethylsiloxane having an approximate viscosity of 10 mm$^2$/s and (2) fluoroalkyl- and trimethylsilyl-treated silica.

0.7 parts by weight of the reaction product of platinum dichloride and tetramethyldivinyldisiloxane that has been diluted with a liquid dimethylvinylsiloxy-terminated polydimethylsiloxane and tetramethyldivinyldisiloxane in an amount sufficient to achieve a platinum content of 0.5 weight percent.

2.6 parts by weight of n-propanol.

Part B 24 parts by weight of hydroxy-terminated polydimethylsiloxane having a viscosity of approximately 2,000 mPa.s.

22 parts by weight of hydroxy-terminated polydimethylsiloxane having a viscosity of approximately 13,500 mPa.s. 28 parts by weight of a trimethylsiloxy-terminated polymethylhydrogensiloxane with a silicon-bonded hydrogen content of 1.6 weight percent and having a viscosity of 30 mm$^2$/s.

26 parts by weight of hydroxy-terminated polydimethylsiloxane having a viscosity of approximately 75 mm$^2$/s and having a hydroxyl content of about 1.75 weight percent.

EXAMPLE 1

Part A 27.8 parts by weight of hydroxy-terminated polydimethylsiloxane having a viscosity of approximately 50,000 mPa.s.

37.2 parts by weight of hydroxy-terminated polydimethylsiloxane having a viscosity of approximately 2,000 mPa.s.

18.8 parts by weight of hydroxy-terminated polydimethylsiloxane having a viscosity of approximately 75 mm$^2$/s and having a hydroxyl content of about 1.75 weight percent.

12 parts by weight of a mixture containing equal parts by weight of (1) a trimethylsiloxy-terminated polydimethylsiloxane having an approximate viscosity of 10 mm$^2$/s and (2) fluoroalkyl- and trimethylsilyl-treated silica.

1.2 parts by weight of the reaction product of platinum dichloride and tetramethyldivinyldisiloxane that has been diluted with a liquid dimethylvinylsiloxy-terminated polydimethylsiloxane and tetramethyldivinyldisiloxane in an amount sufficient to achieve a platinum content of 0.5 weight percent.

3 parts by weight of n-propanol

Part B 24 parts by weight of hydroxy-terminated polydimethylsiloxane having a viscosity of approximately 2,000 mPa.s.

22 parts by weight of hydroxy-terminated polydimethylsiloxane having a viscosity of approximately 13,500 mPa.s.

28 parts by weight of a trimethylsiloxy-terminated polymethylhydrogensiloxane with a silicon-bonded hydrogen content of 1.6 weight percent and having a viscosity of 30 mm$^2$/s.

26 parts by weight of hydroxy-terminated polydimethylsiloxane having a viscosity of approximately 75 mm$^2$/s and having a hydroxyl content of about 1.75 weight percent.

COMPARATIVE EXAMPLE 2

Part A 60.4 parts by weight of hydroxy-terminated polydimethylsiloxane having a viscosity of approximately 2,000 mPa.s.

31.3 parts by weight of hydroxy-terminated polydimethylsiloxane having a viscosity of approximately 75 mm$^2$/s and having a hydroxyl content of about 1.75 weight percent.

5 parts by weight of a mixture containing equal parts by weight of (1) a trimethylsiloxy-terminated polydimethylsiloxane having an approximate viscosity of 10 mm$^2$/s and (2) fluoroalkyl- and trimethylsilyl-treated silica.

0.7 parts by weight of the reaction product of platinum dichloride and tetramethyldivinyldisiloxane that has been diluted with a liquid dimethylvinylsiloxy-termimanted polydimethylsiloxane and tetramethyldivinyldisiloxane in an amount sufficient to achieve a platinum content of 0.5 weight percent.

2.6 parts by weight of n-propanol.

Part B 12.5 parts by weight of hydroxy-terminated polydimethylsiloxane having a viscosity of approximately 13,500 mPa.s.

13.6 parts by weight of hydroxy-terminated polydimethylsiloxane having a viscosity of approximately 2,000 mPa.s.

14.8 parts by weight of hydroxy-terminated polydimethylsiloxane having a viscosity of approximately 75 mm$^2$/s and having a hydroxyl content of about 1.75 weight percent.

59.1 parts by weight of the product obtained by blending 58.8 wt % of a 70 wt % xylene solution of a siloxane resin copolymer consisting essentially of $(CH_3)_3SiO_{1/2}$ units and $SiO_2$ units in a molar ratio of approximately 0.75:1 and containing approximately 2.65 weight percent hydroxyl based on solids as determined by FTIR (ASTM E-168) and 41.2 wt % of trimethylsiloxy endblocked polymethylhydrogensiloxane having a viscosity of 0.13 Pa.s and a silicon-bonded hydrogen atom content of 1.6 wt % and thereafter heating to remove substantially all the solvent. The product has a viscosity of approximately 1400 mm²/s, an SiH content of approximately 0.8 wt % and a hydroxyl content of approximately 1.7 wt %.

EXAMPLE 2

Part A 27.8 parts by weight of hydroxy-terminated polydimethylsiloxane having a viscosity of approximately 50,000 mPa.s.

37.2 parts by weight of hydroxy-terminated polydimethylsiloxane having a viscosity of approximately 2,000 mPa.s.

18.8 parts by weight of hydroxy-terminated polydimethylsiloxane having a viscosity of approximately. 75 mm²/s and having a hydroxyl content of about 1.75 weight percent.

12 parts by weight of a mixture containing equal parts by weight of (1) a trimethylsiloxy-terminated polydimethylsiloxane having an approximate viscosity of 10 mm²/s and (2) fluoroalkyl- and trimethylsilyl-treated silica.

1.2 parts by weight of the reaction product of platinum dichloride and tetramethyldivinyldisiloxane that has been diluted with a liquid dimethylvinylsiloxy-terminated polydimethylsiloxane and tetramethyldivinyldisiloxane in an amount sufficient to achieve a platinum content of 0.5 weight percent.

3 parts by weight of n-propanol

Part B 12.5 parts by weight of hydroxy-terminated polydimethylsiloxane having a viscosity of approximately 13,500 mPa.s.

13.6 parts by weight of hydroxy-terminated polydimethylsiloxane having a viscosity of approximately 2,000 mPa.s.

14.8 parts by weight of hydroxy-terminated polydimethylsiloxane having a viscosity of approximately 75 mm²/s and having a hydroxyl content of about 1.75 weight percent.

59.1 parts by weight of the product obtained by blending 58.8 wt % of a 70 wt % xylene solution of a siloxane resin copolymer consisting essentially of $(CH_3)_3SiO_{1/2}$ units and $SiO_2$ units in a molar ratio of approximately 0.75:1 and containing approximately 2.65 weight percent hydroxyl based on solids as determined by FTIR (ASTM E-168) and 41.2 wt % of trimethylsiloxy endblocked polymethylhydrogensiloxane having a viscosity of 0.13 Pa.s and a silicon-bonded hydrogen atom content of 1.6 wt % and thereafter heating to remove substantially all the solvent. The product has a viscosity of approximately 1400 mm²/s, an SiH content of approximately 0.8 wt % and a hydroxyl content of approximately 1.7 wt %.

TABLE 1

Physical Properties Of Foam Prepared From Compositions Containing A Combination Of High And Low Molecular Weight Polyorganosiloxanes v. Physical Properties Of Foams Prepared From Compositions Without Such A Combination Of Polyorganosiloxanes.

|  | Comparative Example 1 | Example 2 | Comparative Example 2 | Example 2 |
|---|---|---|---|---|
| Density (pcf) | 5.9 | 5.6 | 6.5 | 6.4 |
| Friability | High | Moderate | Moderate | Low |
| Resistance to Tearing Under Flex? (fold test) | Pass | Fail | Pass | Pass |
| Tear Strength (ppi)* | 0.40 | 0.53 | 0.42 | 0.76 |
| Tensile Strength (psi)* | 2.3 | 2.5 | 2.5 | 5.6 |
| Elongation (%)* | 30.9 | 62.3 | 22.3 | 63.3 |
| *Sheet Thickness (in.) | 0.23 | 0.32 | 0.29 | 0.29 | pcf is pounds per cubic foot.
ppi is pounds per inch.
psi is pounds per square inch.

That which is claimed is:

1. A foamable organosiloxane composition, comprising:
   (A) a siloxane base polymer system comprising:
      (i) a high molecular weight polyorganosiloxane containing an average of at least two hydroxyl groups per molecule and having a viscosity at 25° C. ($V_i$); and
      (ii) a low molecular weight polyorganosiloxane containing an average of at least two hydroxyl groups per molecule and having a viscosity at 25° C. ($V_{ii}$); wherein $V_{ii} \leq V_i - 25,000$ mPa.s;
   (B) a silicon-containing crosslinker for the siloxane base polymer system, wherein the crosslinker contains at least two —SiH groups per molecule; and
   (C) a platinum group catalyst sufficient for curing the foamable organosiloxane composition.

2. The foamable organosiloxane composition of claim 1 further comprising
   (E) a blowing agent.

3. The foamable organosiloxane composition of claim 2 wherein the blowing agent is selected from the group consisting of water, monofunctional alcohols and polyols.

4. The foamable organosiloxane composition of claim 1 wherein $V_i \geq 45,000$ mPa.s. and $V_{ii} \leq 9,500$ mPa.s.

5. The foamable organosiloxane composition of claim 4 wherein $V_{ii} \leq 5,000$ mPa.s.

6. The foamable organosiloxane composition of claim 5 wherein $V_{ii} \leq 2,000$ mPa.s.

7. The foamable organosiloxane composition of claim 1 wherein $V_i > 25,000$ mPa.s. and $V_{ii} \leq 2,000$ mPa.s.

8. The foamable organosiloxane composition of claim 7 wherein $V_i \geq 30,000$ mPa.s.

9. The foamable organosiloxane composition of claim 1 where component (i) has the general formula:

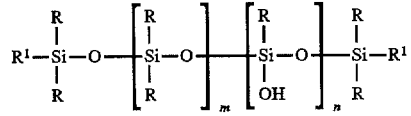

wherein each R is individually selected from the group consisting of methyl, 3,3,3-trifluoropropyl and phenyl, $R^1$ is R or a hydroxyl radical and the values of m and n are selected such that the resulting polyorganosiloxane has an average of at least two hydroxyl groups and $V_i \geq V_{ii}+25{,}000$ mPa.s.

10. The foamable organoiiloxane composition of claim 9 wherein each $R^1$ of component (i) is a hydroxyl group.

11. The foamable organosiloxane composition of claim 1 wherein component (i) constitutes from 25 to 60 parts per 100 parts of component (A).

12. The foamable organosiloxane composition of claim 11 wherein component (i) constitutes from 40 to 55 parts per 100 parts of component (A).

13. The foamable organosiloxane composition of claim 1 wherein component (ii) has the general formula:

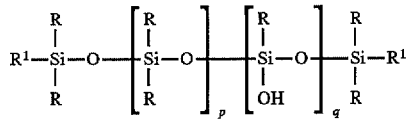

wherein each R is individually selected from the group consisting of methyl, 3,3,3-trifluoropropyl and phenyl, $R^1$ is R or a hydroxyl radical and the values of p and q are selected such that the resulting polyorganosiloxane has an average of at least two hydroxyl groups and $V_{ii} \leq V_i - 25{,}000$ mPa.s.

14. The foamable organosiloxane composition of claim 11 wherein each $R^1$ is a hydroxyl group.

15. The foamable organosiloxane composition of claim 1 wherein component (ii) constitutes 45 to 60 parts by weight per 100 parts by weight of component (A).

16. The foamable organosiloxane composition of claim 1 wherein component (B) contains an average of at least three silicon-bonded hydrogen atoms per molecule.

17. The foamable organosiloxane composition of claim 1 wherein the weight ratio of component (A) to component (B) is from 16:1 to 1:1.

18. The foamable organosiloxane composition of claim 17 wherein the weight ratio of component (A) to component (B) is 6:1 to 2:1.

19. The foamable organosiloxane composition of claim 1 further comprising fluoroalkyl-treated silica and trimethylsilyl-treated silica.

20. The foamed product obtained from the incipient materials:

(A) a siloxane base polymer system comprising:
  (i) a high molecular weight polyorganosiloxane containing an average of at least two hydroxyl groups per molecule and having a viscosity at 25° C. ($V_i$); and
  (ii) a low molecular weight polyorganosiloxane containing an average of at least two hydroxyl groups per molecule and having a viscosity at 25° C. ($V_{ii}$); wherein $V_{ii} \leq V_i - 25{,}000$ mPa.s;

(B) a silicon-containing crosslinker for the siloxane base polymer system, wherein the crosslinker contains at least two —SiH groups per molecule;

(C) a platinum group catalyst sufficient for curing a composition prepared by mixing components (A), and (B); and (E) a blowing agent.

* * * * *